UNITED STATES PATENT OFFICE.

EDMUND M. FLAHERTY, OF PARLIN, NEW JERSEY, ASSIGNOR TO E. I. DU PONT DE NEMOURS AND COMPANY, OF WILMINGTON, DELAWARE, A CORPORATION OF DELAWARE.

PYROXYLIN SOLVENT AND COMPOSITION CONTAINING THE SAME.

1,323,624. Specification of Letters Patent. Patented Dec. 2, 1919.

No Drawing. Application filed March 5, 1918, Serial No. 220,487. Renewed September 26, 1919. Serial No. 326,537.

*To all whom it may concern:*

Be it known that I, EDMUND M. FLAHERTY, of Parlin, in the county of Middlesex, and in the State of New Jersey, have invented a certain new and useful Improvement in Pyroxylin Solvent and Compositions Containing the Same, and do hereby declare that the following is a full, clear, and exact description thereof.

The object of my invention is to provide a solvent for pyroxylin bodies having the qualities of being cheap, having high solvent power, being free from precipitation of pyroxylin, non-hygroscopic, adapted to form a very fluid but cohesive solution, and of pleasant odor.

A further object is to use a solvent composition containing constituents which have approximately the same vapor tension, as it is desirable to have a number of the constituents evaporate more or less simultaneously.

A further object is to provide a solvent composition which, by reason of the presence of the particular alcohol therein, can be regulated as to its fluidity by varying the quantity of the alcohol as compared with the quantity of solid constituents therein.

In the pyroxylin industries, such as in the manufacture of lacquers, artificial leather, varnishes, etc., there is a demand for a solvent having the above-stated qualities. None of the ordinary pyroxylin solvents, such as glacial acetic acid, amyl acetate and acetone, including their homologues and derivatives, has all of these properties in the highest degree, except, perhaps, amyl acetate, the price of which is very high. In these several industries, it is desirable to vary the relative proportions of the solvent and pyroxylin to obtain a solution of the strength desired, according to the nature of the pyroxylin film to be formed. For example, in lacquer work the solution ordinarily does not contain over five ounces of pyroxylin per gallon in order that a film of proper thickness may be deposited. In some of the decorative arts a very heavy film is employed, which can be deposited from a solution containing as high as twenty ounces of pyroxylin per gallon. There is, thus, for each industry a strength of solution which is best adapted thereto. Where a solution is desired having less pyroxylin than the total amount which the solvent is capable of taking up (for instance, if a solution of twenty ounces of pyroxylin to a gallon of solvent were desired, which is less than the total amount which the solvent would take up), it is unnecessary to have the entire quantity of solution composed of pure solvent, it only being necessary to have enough solvent present to dissolve the desired amount of pyroxylin. For economy, therefore, it is customary to add cheap diluents to the solvent, which diluents are either entirely non-solvent or nearly so. The use of diluents, however, introduces difficulties, among which may be mentioned the following: When, as used in a factory, these solvents are evaporated at the ordinary room atmosphere in order to deposit a film of pyroxylin, there is a tendency, except in the case of those solvents which are non-hygroscopic but expensive, such as amyl acetate, toward a separation out of the nitrocellulose or other solvents through absorption of moisture from the air or through the change in the composition of the solvent mixture resulting from the unequal rate of evaporation of its components, this precipitation being usually evidenced by the appearance of a whitish substance, technically known as "blushing" or "blooming," or by the settling to the bottom of a jellylike mass. Such separation tends to decrease the strength of the film, and, in some cases, the white appearance produces objectionable color effects.

I have discovered that by using a mixture of butyl acetate and xylol, or one of its homologues, or solvent naphtha, with or without the presence of an alcohol, such for example as butyl alcohol, in which composition xylol is the diluent, a mixture is obtained which has a maximum solvent power and is free from precipitation of the pyroxylin. Such mixture is also comparatively non-hygroscopic. When these materials are mixed together, the solvent power of the more active solvent, butyl acetate, is retained, so that the mixture may contain as high as seventy per cent., or even more, of xylol. I find that during evaporation under ordinary factory conditions the butyl acetate and xylol mixture deposits a film which is strong and transparent.

For example, my invention may be carried out by using a solvent comprised of 40% by weight of butyl acetate and 60% by weight of xylol, or, instead, I may use a solvent mixture comprising 41 parts by weight of butyl acetate, 50 parts by weight of xylol and 9 parts of butyl alcohol having dissolved therein a quantity of nitrocellulose in the proportion of 2 pounds of nitrocellulose to 7 pounds of the solvent mixture. But the relative percentages of these ingredients may vary widely according to the conditions covering the innumerable uses to which the solution may be put.

I have given specific instances merely by way of illustration, and am not to be confined to the particular proportions given, as they are to be regarded as typical only.

An increase in the xylol component results in reduced cost and its disadvantage lies in the less rapid solvent action which such a mixture possesses.

The fluidity can be varied by varying the quantity of the alcohol.

Numerous other substances, such as other pyroxylin solvents, oils, pigments, gums, resins, etc., may be added to the pyroxylin mixture, each having its own properties, and these properties will, of course, effect the properties of the final mixture, but the general principle will still obtain.

Among the homologues of xylol which I may use instead of the same, I may mention toluol. Also, other acyclic alcohols may be used instead of the butyl alcohol, as for example ethyl alcohol. For any of these compositions, furthermore, the butyl acetate of commerce may be used, if desired, which commercial butyl acetate contains about 10% by weight of butyl alcohol.

I find that my mixture is comparatively non-hygroscopic, which is a very desirable quality, since the absorption of water in such a solution results in a precipitation of the pyroxylin.

I find, furthermore, that the butyl acetate and xylol composition is a mixture having practically a constant boiling point, and a very even rate of evaporation, which is desirable.

While I have described my invention above in detail, I wish it to be understood that many changes may be made therein without departing from the spirit of the invention.

I claim:

1. A composition comprising a mixture of butyl acetate and xylol.

2. A composition comprising a mixture of butyl acetate, xylol and an acyclic alcohol.

3. A composition comprising a mixture of butyl acetate, a benzene hydrocarbon and butyl alcohol.

4. A composition comprising a mixture of butyl acetate, xylol and butyl alcohol.

5. A composition comprising pyroxylin and a pyroxylin solvent comprising a mixture of butyl acetate and xylol.

6. A composition comprising pyroxylin and a pyroxylin solvent comprising a mixture of butyl acetate, xylol and an acyclic alcohol.

7. A composition comprising pyroxylin and a pyroxylin solvent comprising a mixture of butyl acetate, a benzene hydrocarbon and butyl alcohol.

8. A composition comprising pyroxylin and a pyroxylin solvent comprising a mixture of butyl acetate, xylol and butyl alcohol.

In testimony that I claim the foregoing I have hereunto set my hand.

EDMUND M. FLAHERTY.

Witnesses:
 A. T. DAVENPORT,
 E. C. RODDY.